Patented Oct. 9, 1928.

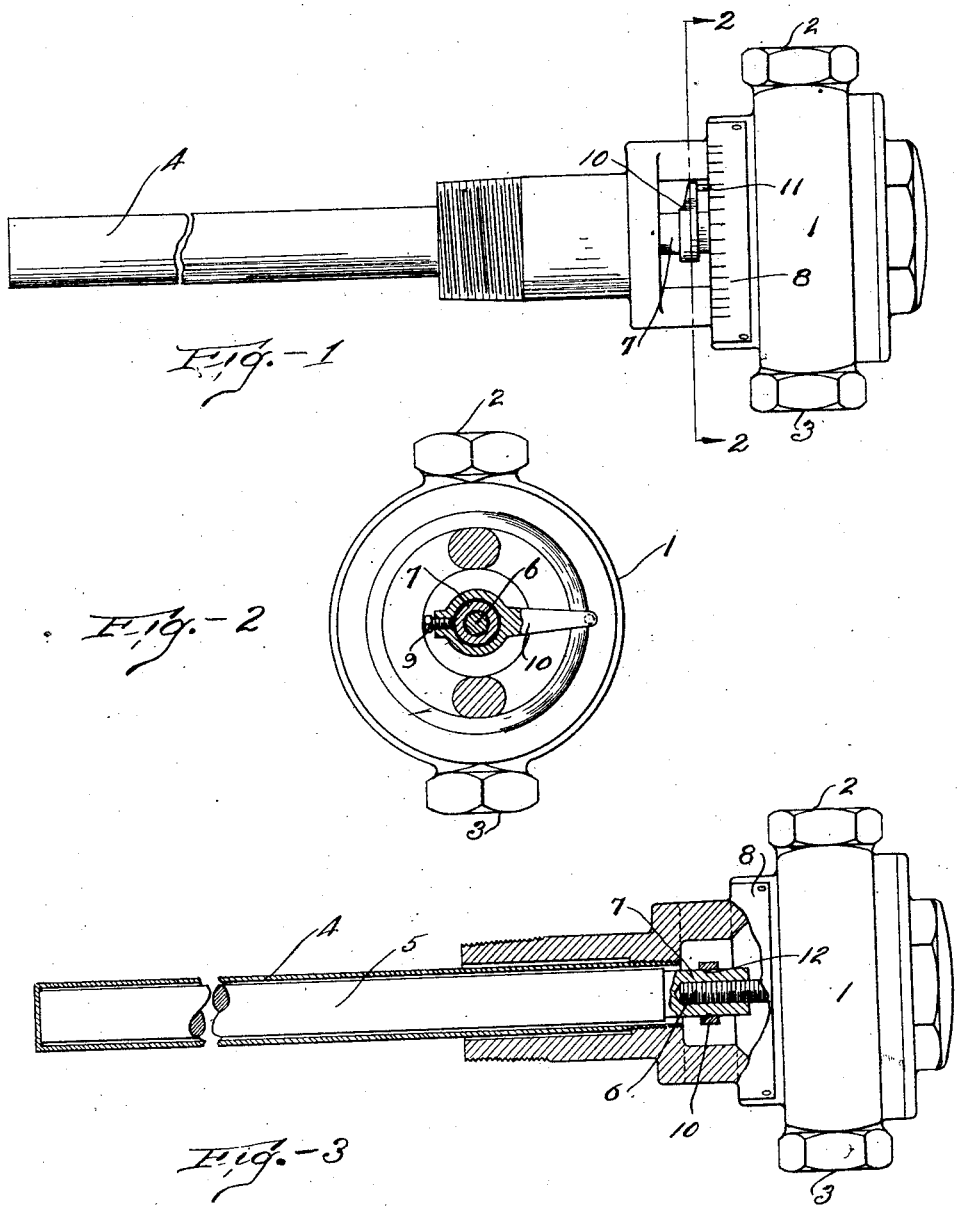

1,687,104

UNITED STATES PATENT OFFICE.

CLARENCE H. MORROW, OF CLEVELAND, OHIO, ASSIGNOR TO THE HOTSTREAM HEATER COMPANY, OF CLEVELAND, OHIO, A CORPORATION OF OHIO.

THERMOSTATIC-INDICATOR-SECURING MEANS.

Application filed August 26, 1926. Serial No. 131,805.

This invention relates to means for adjusting thermostatic gas regulators and has especial reference to the provision of means for adjustment of the indicator of such a regulator during the calibration thereof, whereby subsequent corrections in calibrations including re-adjustment may be effected without the difficulties heretofore encountered.

The exact nature of the invention is difficult of description in few words but will be evident from the following description taken in connection with the accompanying drawings in which Fig. 1 is a side view of a regulator such as described, with my invention incorporated therein; Fig. 2 is a section as along line 2—2, Fig. 1 showing the indicator or regulator adjusted to a different setting from that of Fig. 1; and Fig. 3 is a view similar to that of Fig. 1 but partly in section to show the construction and relation of the parts.

The regulator comprises a head 1 provided with inlet and outlet openings 2 and 3 and enclosing a spring seated valve the details of which are immaterial here and consequently not shown. Extending from the head are a pair of thermostatic elements 4 and 5, the outer element 4 being secured to a shank portion preferably integral with the head and provided with screw threads whereby the regulator may be attached to a chamber such as a water tank to be thermally responsive to the contents thereof. The inner thermostatic element 5 is of course adapted for expansion greater than that of the outer element 4 responsive to temperature rise, to lift the valve within the head 1 from its seat. Longitudinal adjustment between the inner member and the valve is accomplished by a threaded engagement between the stem 6 of the valve and a short metallic rod 7 in fixed relation with the thermostatic member 5.

Upon the head 1 is a graduated scale 8 and secured upon the cylinder surface of the member 7 by means of a set screw 9 is an indicator 10 carrying a finger 11 adapted for movement over the scale 8 to selectively fix the relation between the thermostat and the valve whereby the desired temperature regulation of the flame controlled by the valve may be effected.

What has thus far been described is old in the art; and it is desirable and common to quite accurately calibrate the thermostat, that is to fix the angular relation between the indicator 10 and the rod 7 so that by movement of the finger 11 to the proper calibration upon the scale, the actual temperature maintained by the thermostat will be that indicated upon the scale. It is occasionally necessary however, to recalibrate the thermostat which of course involves readjustment of the indicator 10 upon the rod 7. In order to prevent accidental movement between the indicator 10 and the rod 7 upon which it is mounted, and for other reasons, it is preferable that the member 7 be made of relatively soft material and the cap screw 9 by which the indicator is set be of relatively hard material, and the set screw be turned very tightly against the rod 7. The result is that the surface of the rod 7 is deformed by the point of the set screw, so that when it is desired to readjust the indicator it is found difficult or impossible even upon release of the set screw, to effect the desired rotation of the indicator.

In order to overcome this difficulty, I provide upon the rod 7 in the desired plane of the screw an annular groove 12 in which the set screw will obviously bottom when tightened.

It will be obvious that by the employment of this construction when the set screw is released any deformation within the groove 12 will be immaterial as effecting a smooth rotation through any desired angle of the indicator upon the rod 7.

What I claim is:

1. In an article of the class described, a valve, a thermally responsive element, a cylindrical rod secured with said element and in threaded relation with the stem of said valve, an indicator for adjustment and indication of said relation, and means for adjustably securing said indicator from movement upon said rod, said means comprising an annular groove in said rod and a member threaded in said indicator and adapted to be turned therein to engage the bottom of said groove.

2. In an article of the class described, a head, a valve therein, a thermally responsive element, a cylindrical rod secured with said element and in threaded relation with the stem of said valve, an indicator for adjustment of said relation, a scale upon said head, a finger on said indicator adapted to indicate on said scale the adjustment of said relation, an annular groove on said rod, a member threaded in said indicator and projecting into said groove to longitudinally position said indicator on said rod, said groove being located on said rod to position said finger over said scale, said member being adapted to engage the bottom of said groove to adjustably secure said indicator from angular movement on said rod.

In testimony whereof I hereby affix my signature.

CLARENCE H. MORROW.